(12) United States Patent
Edmonds et al.

(10) Patent No.: US 8,773,667 B2
(45) Date of Patent: Jul. 8, 2014

(54) SPHERE BAR PROBE

(75) Inventors: Peter Edmonds, Sanford, FL (US); Kenneth Steffey, Longwood, FL (US)

(73) Assignee: Faro Technologies, Inc., Lake Mary, FL (US)

( * ) Notice: Subject to any disclaimer, the term of this patent is extended or adjusted under 35 U.S.C. 154(b) by 225 days.

(21) Appl. No.: 13/008,763

(22) Filed: Jan. 18, 2011

(65) Prior Publication Data
US 2011/0176145 A1    Jul. 21, 2011

Related U.S. Application Data

(60) Provisional application No. 61/295,848, filed on Jan. 18, 2010.

(51) Int. Cl.
  *G01B 11/24*  (2006.01)
  *G01S 17/42*  (2006.01)
  *G01S 17/66*  (2006.01)
  *G01C 15/00*  (2006.01)
  *G01B 11/02*  (2006.01)

(52) U.S. Cl.
  CPC ............ *G01C 15/002* (2013.01); *G01S 17/42* (2013.01); *G01B 11/24* (2013.01); *G01S 17/66* (2013.01); *G01B 11/026* (2013.01)
  USPC ............ 356/601; 356/72; 250/577; 359/529; 359/534

(58) Field of Classification Search
  USPC .................. 356/601, 72; 359/529; 250/577
  See application file for complete search history.

(56) References Cited

U.S. PATENT DOCUMENTS

| 3,861,808 | A | 1/1975 | Halsey |
| 5,530,549 | A | 6/1996 | Brown |
| 5,861,956 | A * | 1/1999 | Bridges et al. ............... 356/614 |
| 6,299,122 | B1 | 10/2001 | Bame |
| 6,675,122 | B1 | 1/2004 | Markendorf et al. |
| 6,813,840 | B1 | 11/2004 | Delmas et al. |
| 6,847,436 | B2 * | 1/2005 | Bridges ..................... 356/4.02 |
| 7,173,779 | B2 * | 2/2007 | Shelef ........................ 359/819 |
| 7,248,374 | B2 * | 7/2007 | Bridges ..................... 356/614 |
| 7,285,793 | B2 | 10/2007 | Husted |
| 7,800,758 | B1 * | 9/2010 | Bridges et al. ............... 356/482 |
| RE41,877 | E | 10/2010 | Parker |

(Continued)

FOREIGN PATENT DOCUMENTS

| EP | 1065469 A1 | 1/2001 |
| JP | 10313424 A | 11/1998 |
| WO | 9535480 A1 | 12/1995 |
| WO | 2008067561 A2 | 6/2008 |

OTHER PUBLICATIONS

International Preliminary Report on Patentability and Written Opinion for Application No. PCT/US2011/021561; Date of Issue Jul. 24, 2012.

(Continued)

*Primary Examiner* — Tarifur Chowdhury
*Assistant Examiner* — Isiaka Akanbi
(74) *Attorney, Agent, or Firm* — Cantor Colburn LLP

(57) ABSTRACT

Exemplary embodiments include a sphere bar probe apparatus, including a holder, a retroreflector disposed in the holder, a member having a first end and a second end, wherein the first end is attached to the holder and an end plate attached to the second end of the member.

13 Claims, 10 Drawing Sheets

(56) References Cited

U.S. PATENT DOCUMENTS

| | | | |
|---|---|---|---|
| 7,952,728 B2* | 5/2011 | Ibach et al. | 356/614 |
| 2004/0100705 A1 | 5/2004 | Hubbs | |
| 2006/0066836 A1* | 3/2006 | Bridges et al. | 356/5.13 |
| 2009/0144999 A1 | 6/2009 | Lau | |
| 2009/0177438 A1* | 7/2009 | Raab | 702/152 |
| 2010/0176270 A1* | 7/2010 | Lau et al. | 250/203.2 |

OTHER PUBLICATIONS

International Search Report and Written Opinion for International Application No. PCT/US2011/021561 filed Jan. 18, 2011.

Chinese Office Action for CN Application Serial No. 2014032801007980, issued Apr. 2, 2014; 14 pages.

* cited by examiner

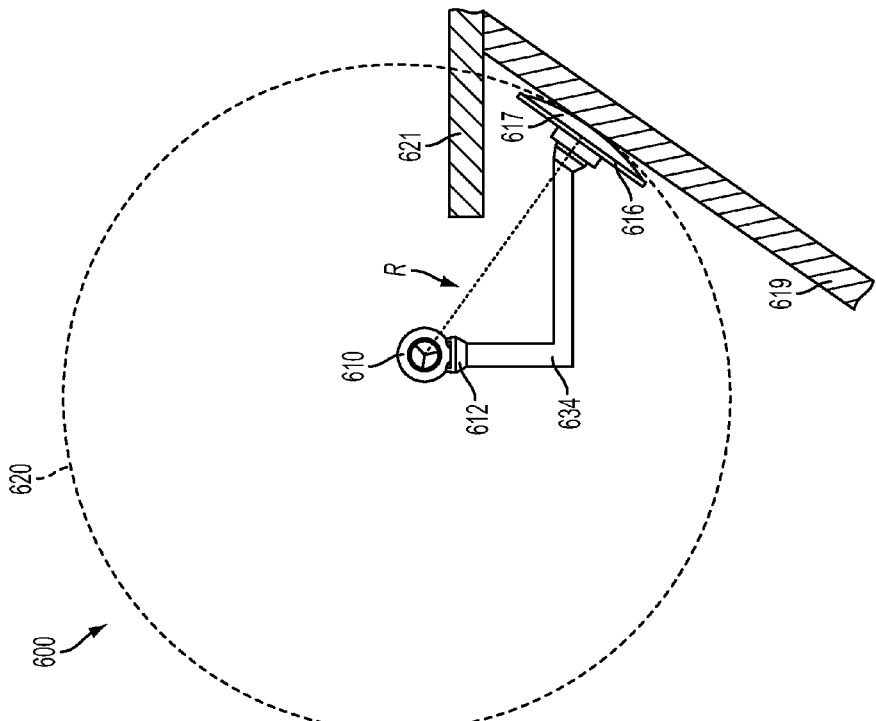
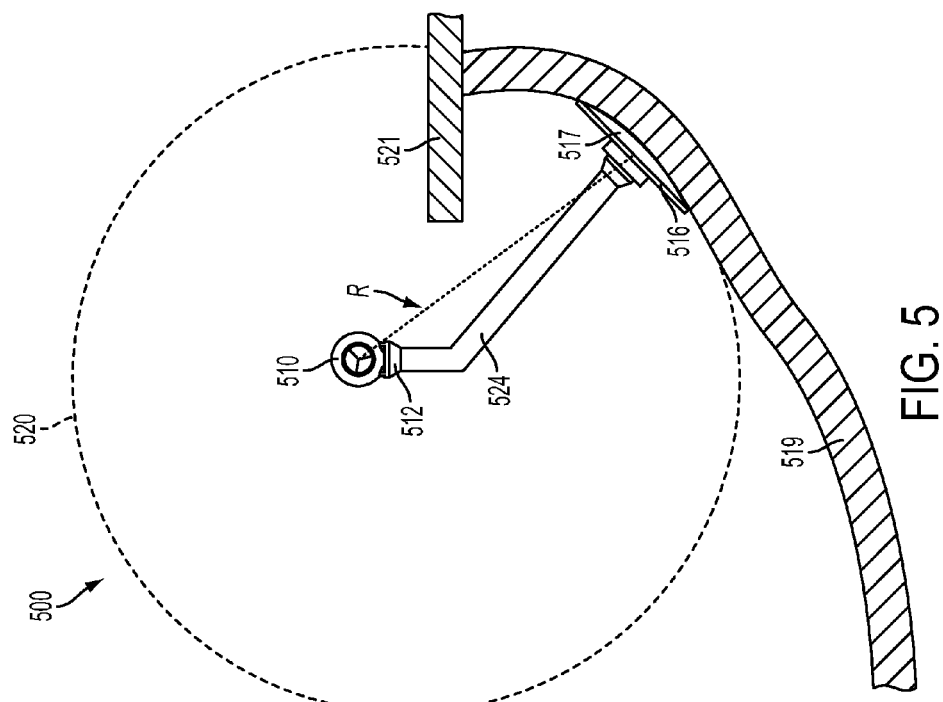

SPHERE BAR PROBE

CROSS-REFERENCE TO RELATED APPLICATIONS

This application claims the benefit of U.S. Provisional Application Ser. No. 61/295,848 entitled "RETROREFLECTOR PROBE ADAPTOR", filed Jan. 18, 2010, which is incorporated herein by reference in its entirety.

FIELD OF INVENTION

The present invention relates to retroreflector measurement, and more particularly to apparatus and methods enabling a spherically mounted retroreflector to be used with a laser tracker to measure hidden points.

BACKGROUND

There is a class of instrument that measures the coordinates of a point by sending a laser beam to a retroreflector target in contact with a point on an object. The instrument determines the coordinates of the point by measuring the distance and the two angles to the target. The distance is measured with a distance-measuring device such as an absolute distance meter or an interferometer. The angles are measured with an angle-measuring device such as an angular encoder. A gimbaled beam-steering mechanism within the instrument directs the laser beam to the point of interest.

The laser tracker is a particular type of coordinate-measuring device that tracks the retroreflector target with one or more laser beams it emits. Another instrument known as total stations or tachymeters may, in some cases, measure a retroreflector. A broad definition of laser tracker, which encompasses total stations, is used throughout this application.

Ordinarily the laser tracker sends a laser beam to a retroreflector target. A common type of retroreflector target is the spherically mounted retroreflector (SMR), which comprises a cube-corner retroreflector embedded within a metal sphere. The cube-corner retroreflector comprises three mutually perpendicular mirrors. The vertex, which is the common point of intersection of the three mirrors, is located at the center of the sphere. Because of this placement of the cube corner within the sphere, the perpendicular distance from the vertex to any surface on which the SMR rests remains constant, even as the SMR is rotated. Consequently, the laser tracker can measure the 3D coordinates of a surface by following the position of an SMR as it is moved over the surface. Stating this another way, the laser tracker needs to measure only three degrees of freedom (one radial distance and two angles) to fully characterize the 3D coordinates of a surface.

For a laser tracker to measure the distance and two angles to a retroreflector target, the laser beam from the tracker must be able to reach the retroreflector without encountering any obstructions that block the beam. In practice, it is sometimes necessary or convenient to measure a location on an object that is not in the line of sight of the laser beam from the tracker. Such measurements are sometimes referred to as "hidden point" measurements.

Two different methods have been devised for measuring hidden points. The first method is to use a device called a retroprobe. A retroprobe uses a mirror in combination with a retroreflector to create a virtual image of the retroreflector at the location of a physical probe tip. By placing the probe tip at the obstructed (hidden) point and the mirror's reflection of the retroreflector within the line of sight of the laser tracker, the coordinates of the hidden point can be measured. A disadvantage of the retroprobe is that, in some instances, the retroprobe cannot be oriented in the required geometry.

A second method for measuring a hidden point is to use a tracker and probe that together have the ability to measure six degrees of freedom. The six degrees of freedom (six-DOF) include the three degrees of freedom mentioned earlier—distance and two angles—and in addition three angles of probe orientation—for example, pitch, roll, and yaw. By attaching a stylus with a probe tip to the probe, it is possible to measure the coordinates of a hidden point. A disadvantage of such six-DOF laser trackers is that they are more expensive than laser trackers that measure just one distance and two angles.

What is needed is an apparatus or method that enables a laser tracker to measure hidden points.

SUMMARY

Exemplary embodiments include a sphere bar probe apparatus, including a holder, a retroreflector disposed in the holder, a member having a first end and a second end, wherein the first end is attached to the holder and the second end has a radius of curvature, R, and wherein the distance from the center of the retroreflector to the second end is equal to the radius of curvature R.

Additional exemplary embodiments include a sphere bar probe apparatus including a spherically mounted retroreflector (SMR), a nest configured to hold the SMR, a bar having a first end attached to the nest; and a second end of the bar that has a radius of curvature R, wherein the distance from the center of the SMR to the second end of the bar is R.

Further exemplary embodiments include a method for measuring points with a laser tracker, the method including identifying points of interest hidden from a direct line of sight from the laser tracker providing a sphere bar probe apparatus at the points of interest, the apparatus including a holder, a retroreflector disposed in the holder, a member having a first end and a second end, wherein the first end is attached to the holder and the second end has a radius of curvature R and wherein the distance from the center of the retroreflector to the second end is equal to R, measuring points with the laser tracker and subtracting an offset from each of the measured points.

BRIEF DESCRIPTION OF THE DRAWINGS

Embodiments will now be described, by way of example only, with reference to the accompanying drawings which are meant to be exemplary, not limiting, and wherein like elements are numbered alike in several figures, in which:

FIG. 5 illustrates another exemplary embodiment of a sphere bar probe;

FIG. 6 illustrates another exemplary embodiment of a sphere bar probe;

DETAILED DESCRIPTION OF THE PREFERRED EMBODIMENTS

Exemplary embodiments include a sphere bar probe that can be implemented to measure hidden point with a laser tracker. In exemplary embodiments, the sphere bar probe can include a spherically mounted retroreflector, a holder structured to hold the spherically mounted retroreflector, a member having a first end attached to the holder, and an end plate attached to a second end of the member.

Figure 1:
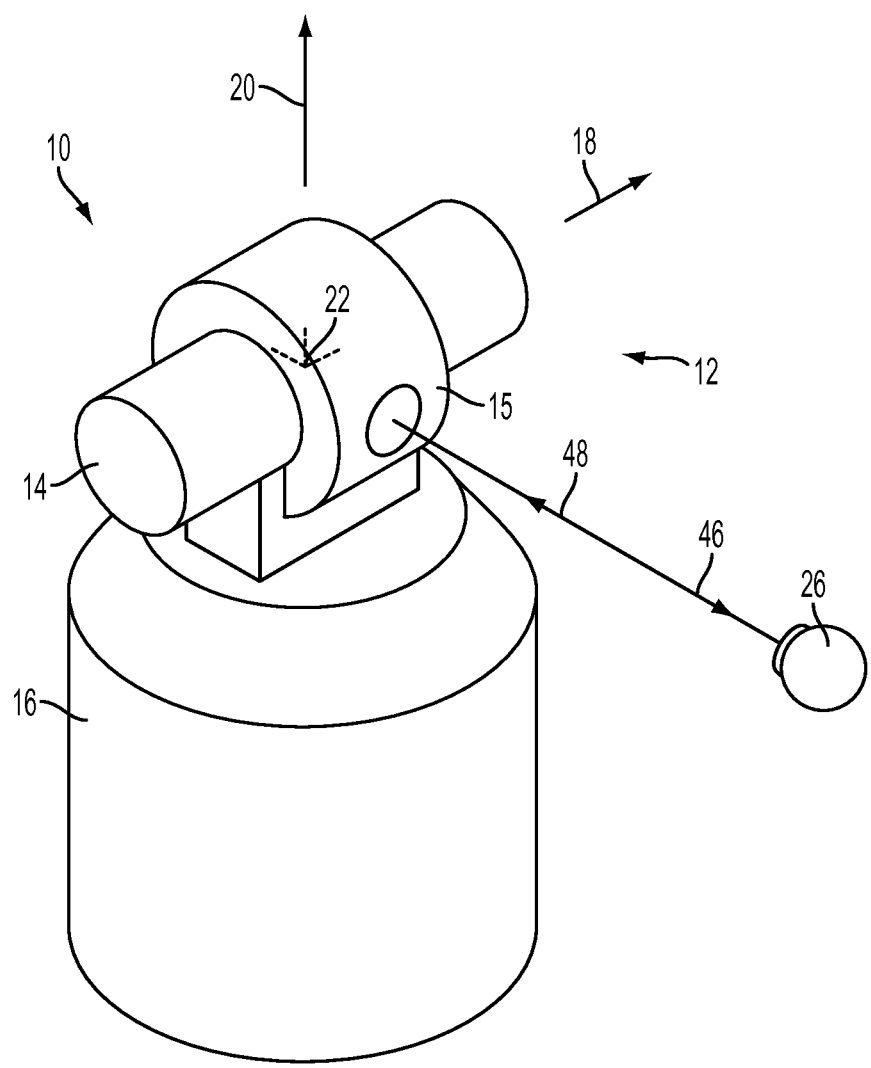
FIG. 1 is a perspective drawing of a laser tracker according to an embodiment.

FIG. 1 illustrates a laser tracker 10 that may be used with the apparatus and method for measuring hidden points as described herein. The laser tracker 10 sends a laser beam 46 from the laser tracker 10 to SMR 26, which returns the laser beam 48 to tracker 10. Laser beam 48 is slightly reduced in optical power with respect to laser beam 46 but otherwise is nearly identical to laser beam 46. An exemplary gimbaled beam-steering mechanism 12 of laser tracker 10 includes zenith carriage 14 mounted on azimuth base 16 and rotated about azimuth axis 20. Payload 15 is mounted on zenith carriage 14 and rotated about zenith axis 18. Zenith mechanical rotation axis 18 and azimuth mechanical rotation axis 20 intersect orthogonally, internally to tracker 10, at gimbal point 22, which is typically the origin for distance measurements. The laser beam 46 virtually passes through gimbal point 22 and is pointed orthogonal to zenith axis 18. In other words, the path of laser beam 46 is in the plane normal to zenith axis 18. Laser beam 46 is pointed in the desired direction by rotation of payload 15 about zenith axis 18 and by rotation of zenith carriage 14 about azimuth axis 20. Zenith and azimuth angular encoders, internal to the tracker (not shown), are attached to zenith mechanical axis 18 and azimuth mechanical axis 20 and indicate, to high accuracy, the angles of rotation. The laser beam 46 travels to SMR 26 and then back to laser tracker 10. The tracker 10 measures the radial distance between gimbal point 22 and retroreflector 26, as well as the rotation angles about the zenith and azimuth axes 18, 20, to find the position of retroreflector 26 within the spherical coordinate system of the tracker.

Figure 2:
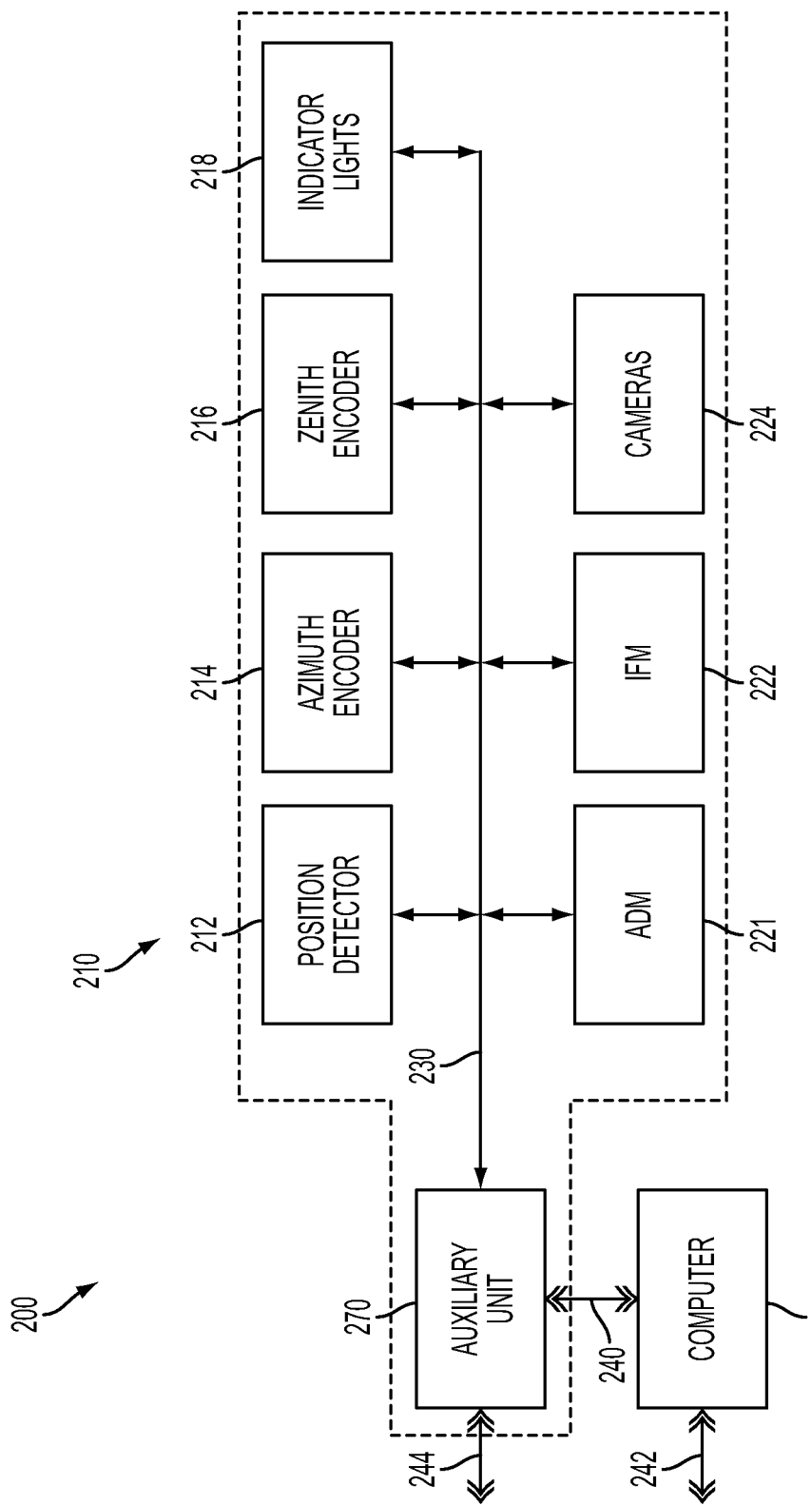
FIG. 2 is a block diagram of a computing system used by a laser tracker according to an embodiment.

An exemplary computing system (processing system) 200 for the laser tracker is shown in FIG. 2. Processing system 200 comprises tracker processing unit 210 and optionally computer 280. Processing unit 210 includes at least one processor, which may be a microprocessor, digital signal processor (DSP), field programmable gate array (FPGA), or similar device. Processing capability is provided to process information and issue commands to internal tracker processors. Such processors may include position detector processor 212, azimuth encoder processor 214, zenith encoder processor 216, indicator lights processor 218, an absolute distance meter (ADM) processor 221, interferometer (IFM) processor 222, and camera processor 224. Auxiliary unit processor 270 optionally provides timing and microprocessor support for other processors within tracker processor unit 210. Preferably, auxiliary unit processor 270 communicates with other processors by means of device bus 230, which may transfer information throughout the tracker by means of data packets, as is well known in the art. Computing capability may be distributed throughout tracker processing unit 210, with DSPs and FPGAs performing intermediate calculations on data collected by tracker sensors. The results of these intermediate calculations are returned to auxiliary unit processor 270. Auxiliary unit processor 270 may be attached to the main body of laser tracker 10 through a long cable, or it may be pulled within the main body of the laser tracker so that the tracker attaches directly (and optionally) to computer 280. Auxiliary unit processor 270 may be connected to computer 280 by connection 240, which is preferably an Ethernet cable or wireless connection. Auxiliary unit 270 and computer 280 may be connected to the network through connections 242, 244, which may be Ethernet cables or wireless connections. Stability computations as described in the exemplary embodiments herein may use processors (microprocessors, DSPs, or FPGAs) from within processing unit 200 or by optional computer 280.

Figure 3:
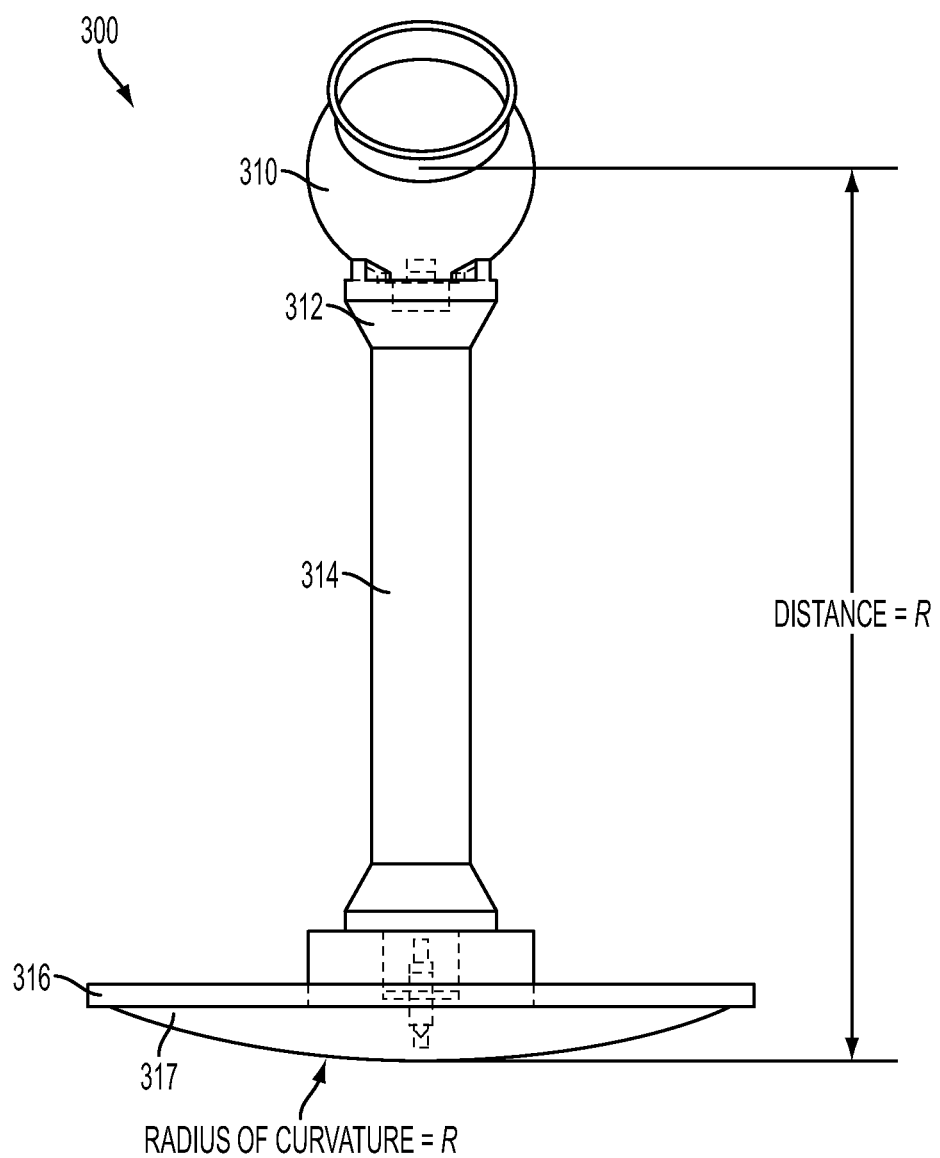
FIG. 3 is a perspective drawing of a sphere bar probe according to an embodiment.

FIG. 3 illustrates an exemplary embodiment of a sphere bar probe 300. In exemplary embodiments, the sphere bar probe 300 may include a holder or nest 312 that holds a retroreflector such as spherically mounted retroreflector 310 (e.g., the SMR 26 of FIG. 1). The nest 312 is coupled to a first end of member or bar 314. The sphere bar probe 300 further includes an end plate 316 that is coupled to a second end of the member or bar 314. The end plate 316 includes a rounded outer surface 317. In exemplary embodiments, a distance, R, between a center of the retroreflector 310 and an outermost end point of the rounded outer surface 317 is equal to a radius of curvature, R, of the rounded outer surface 317.

Figure 4:
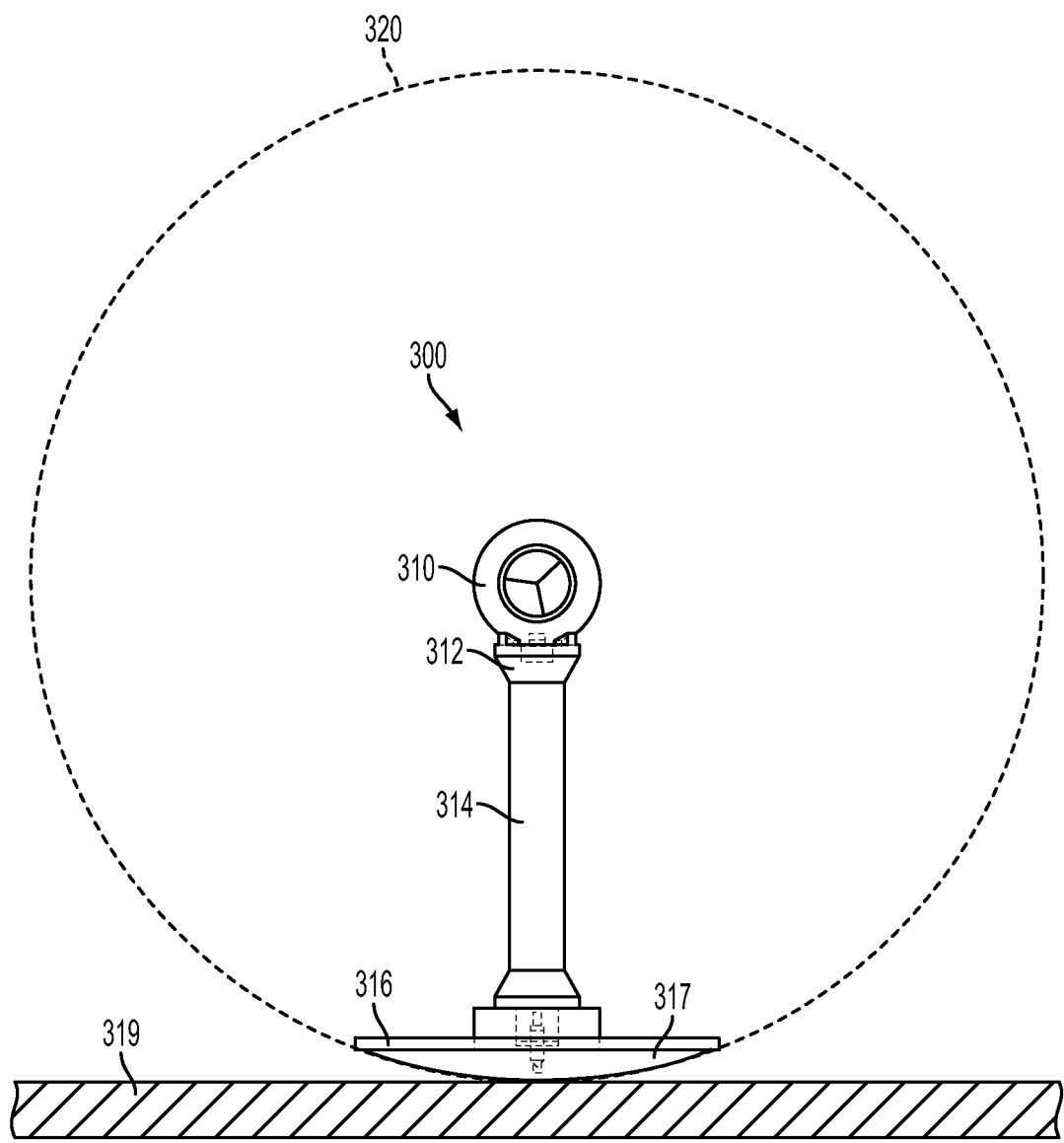
FIG. 4 illustrates another view of the sphere bar probe of FIG. 3.

FIG. 4 illustrates the embodiment of the sphere bar probe 300 of FIG. 3 affixed to a surface 319, points of which are to be measured by a tracker (e.g., the tracker 10 of FIG. 1). However, it is to be appreciated that points of the surface 319 may be out of a direct line of sight view of the tracker. As such, the exemplary sphere bar probe 300 can be implemented to measure hidden points on the surface 319 as now described. As described above, the sphere bar probe 300 includes the holder or nest 312 that holds the retroreflector 310 The nest 312 is coupled to the first end of member or bar 314. The end plate 316 is coupled to the second end of the member or bar 314. As described herein, the end plate 316 includes a rounded outer surface 317. In exemplary embodiments, a distance, R, between a center of the retroreflector 310 and an outermost end point of the rounded outer surface 317 is equal to a radius of curvature, R, of the rounded outer surface 317. The configuration in which the distance between the between a center of the retroreflector 310 and an outermost end point of the rounded outer surface 317 is equal to the radius of curvature of the rounded outer surface 317, defines a virtual sphere 320. As such, the radius of the virtual sphere 320 is also R. The rounded outer surface 317 of the end plate 316 is shaped as a segment of the surface of virtual sphere 320, and contacts the (hidden) point(s) to be measured on the surface 319.

It is appreciated that to the tracker generating the laser beam that travels from the tracker to the retroreflector 310 and back to the tracker in fact interacts with the retroreflector 310 but virtually interacts with an apparent larger retroreflector of radius, R, that is, the virtual sphere 320. As described herein, the tracker determines the position of the retroreflector 310 within the spherical coordinate system of the tracker. It is further appreciated that the distance traveled by the laser beam is the same to the retroreflector 310 as the distance traveled to the virtual sphere 320. In order to obtain an accurate measurement of the points on the surface 319, an appropriate offset is subtracted from the measurements of the points according to a method that depends on the collection of points, as discussed in more detail hereafter.

FIGS. 3 and 4 illustrate an embodiment of the sphere bar probe 300 in which the member or bar 314 is configured in a straight line. In other exemplary embodiments, the member or bar 314 can be replaced with other members or bars having a curved profile or being separated into multiple segments for implementations in which the points to be measured may be on increasingly remote surfaces out of the direct line of sight of the laser tracker.

FIG. 5 illustrates an exemplary embodiment of a sphere bar probe 500. In exemplary embodiments, the sphere bar probe 500 includes a holder or nest 512 that holds a retroreflector 510. The nest 512 is coupled to the first end of a curved member or bar 524. An end plate 516 is coupled to the second end of the member or bar 524. As described herein, the end plate 516 includes a rounded outer surface 517. In exemplary embodiments, a distance, R, between a center of the retroreflector 510 and an outermost end point of the rounded outer surface 517 is equal to a radius of curvature, R, of the rounded outer surface 517. In the example in FIG. 5, in contrast to the embodiment of FIGS. 3 and 4, the distance R is determined by the angle of the curved member or bar 524, by such methods known in the art such as the Pythagorean Theorem. The configuration in which the distance between the between a center of the retroreflector 510 and an outermost end point of the rounded outer surface 517 is equal to the radius of curvature of the rounded outer surface 517, defines a virtual sphere 520. As such, the radius of the virtual sphere 520 is also R. The rounded outer surface 517 of the end plate 516 is shaped as a segment of the surface of virtual sphere 520, and contacts the (hidden) point(s) to be measured on the surface 519. In the example in FIG. 5, an obstacle 521 on the surface 519 creates a further remote location for points to be measured on the surface 519.

FIG. 6 illustrates an exemplary embodiment of a sphere bar probe 600. In exemplary embodiments, the sphere bar probe 600 includes a holder or nest 612 that holds a retroreflector 610. The nest 612 is coupled to the first end of a right angle member or bar 634. An end plate 616 is coupled to the second end of the member or bar 634. As described herein, the end plate 616 includes a rounded outer surface 617. In exemplary embodiments, a distance, R, between a center of the retroreflector 610 and an outermost end point of the rounded outer surface 617 is equal to a radius of curvature, R, of the rounded outer surface 617. In the example in FIG. 6, similar to the example of FIG. 5 and in contrast to the embodiment of FIGS. 3 and 4, the distance R is determined by the angle of the right angle member or bar 634, by such methods known in the art such as the Pythagorean Theorem. The configuration in which the distance between the between a center of the retroreflector 610 and an outermost end point of the rounded outer surface 617 is equal to the radius of curvature of the rounded outer surface 617, defines a virtual sphere 620. As such, the radius of the virtual sphere 620 is also R. The rounded outer surface 617 of the end plate 616 is shaped as a segment of the surface of virtual sphere 620, and contacts the (hidden) point(s) to be measured on the surface 519. In the example in FIG. 6, an obstacle 621 on the surface 619 creates a further remote location for points to be measured on the surface 619.

It will be appreciated that the examples of FIGS. 5 and 6 are illustrative and not limiting examples. It will be understood that the sphere bar probe is not limited to the angles shown in FIGS. 5 and 6, and that a wide variety of angled bars are possible.

Figure 7:
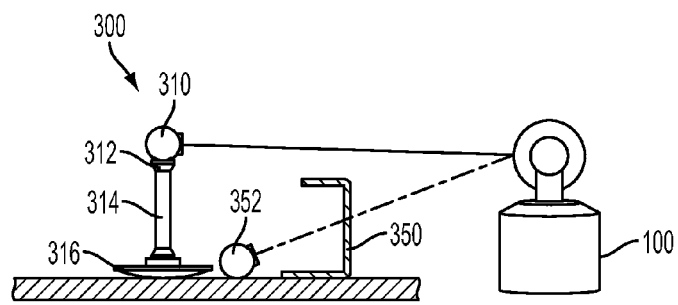
FIG. 7 illustrates an implementation of an exemplary sphere bar probe in the presence of an obstruction.
Figure 8:
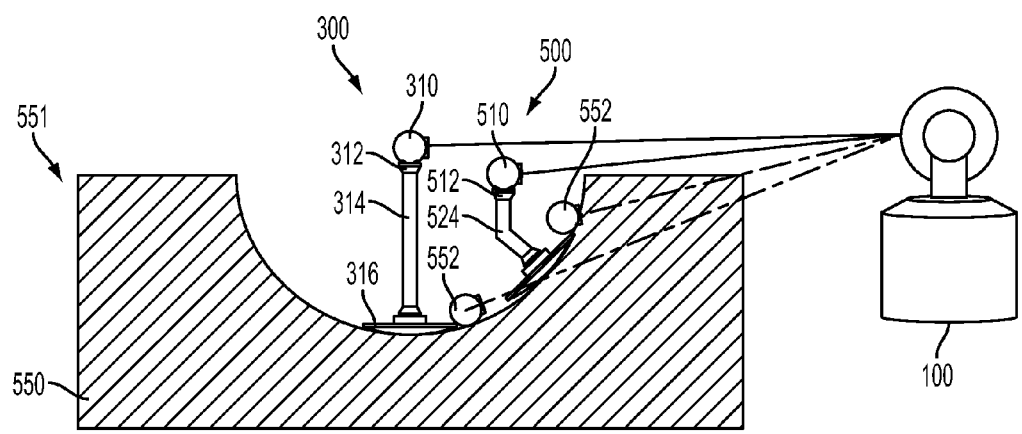
FIG. 8 illustrates another implementation of an exemplary sphere bar probe in the presence of an obstruction.

FIGS. 7 and 8 show how the sphere bar probe 300 can be implemented in practical applications. For example, in FIG. 7, an obstruction 350 blocks a tracker 100 from viewing a standard SMR 352. However, by implementing the sphere bar probe 300, the tracker 100 can make a measurement of a point that is visually hidden behind obstruction 350. In FIG. 8, an obstruction 550 takes the form of a side-wall of a concave structure 551. In this example, an exemplary sphere bar probe 300 with straight bar 314 can be used to measure a point at the bottom of the concave structure, while an exemplary sphere bar probe 500 with an angled bar 524 can be used to measure a point on a side-wall of the concave structure 551. FIG. 4B further shows that tracker 100 is unable to view standard SMRs 552 placed within the concave structure 551.

Figure 9:
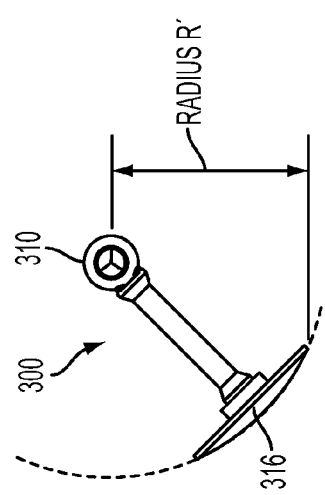
FIG. 9 illustrates an exemplary configuration of the sphere bar probe 300 of FIGS. 3 and 4.
Figure 10:
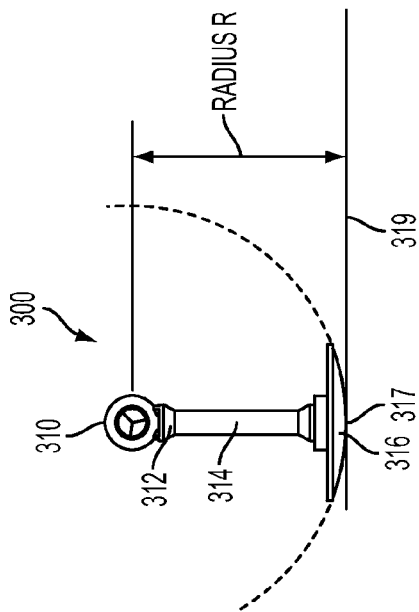
FIG. 10 illustrates an improper alignment of the sphere bar probe of FIGS. 3 and 4.
Figure 11:
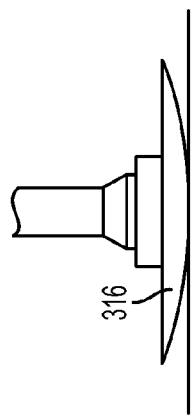
FIGS. 11-13 illustrate examples of edges disposed plate of the sphere bar probe of FIGS. 3 and 4.
Figure 12:
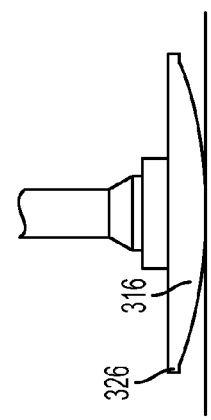
Figure 13:
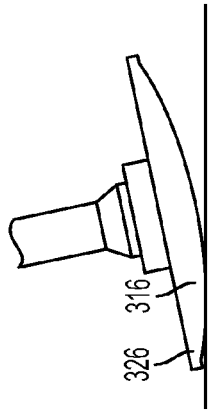

FIG. 9 illustrates an exemplary configuration of the sphere bar probe 300 of FIGS. 3 and 4, for example. A potential Problem is that the sphere bar probe 300 may be improperly placed on the surface 319. For example, FIG. 9 shows a proper alignment of the sphere bar probe 300. FIG. 10 shows an improper alignment, such as when the sphere bar probe 300 is tipped or rolled over the edge of end plate 316, in which the radius of curvature, R, of the end plate 316 is no longer equal to the radius of the sphere 320. Instead, the radius of the misaligned sphere bar probe 300 is R', a distance from the center of the retroreflector 310 to the surface 319. To prevent such a misalignment, the end plate 316 can be formed with edge 326 around the circumference of end plate 316, as illustrated in FIGS. 11-13. The structure of edge 326 can provide a tactile feedback to the user to alert the user when the sphere bar probe is tipped out of proper alignment. In addition to tactile feedback from edge 326, the end plate 316 can also be fitted with an electronic switch to alert the user when the sphere bar probe 300 is misaligned.

Figure 14:
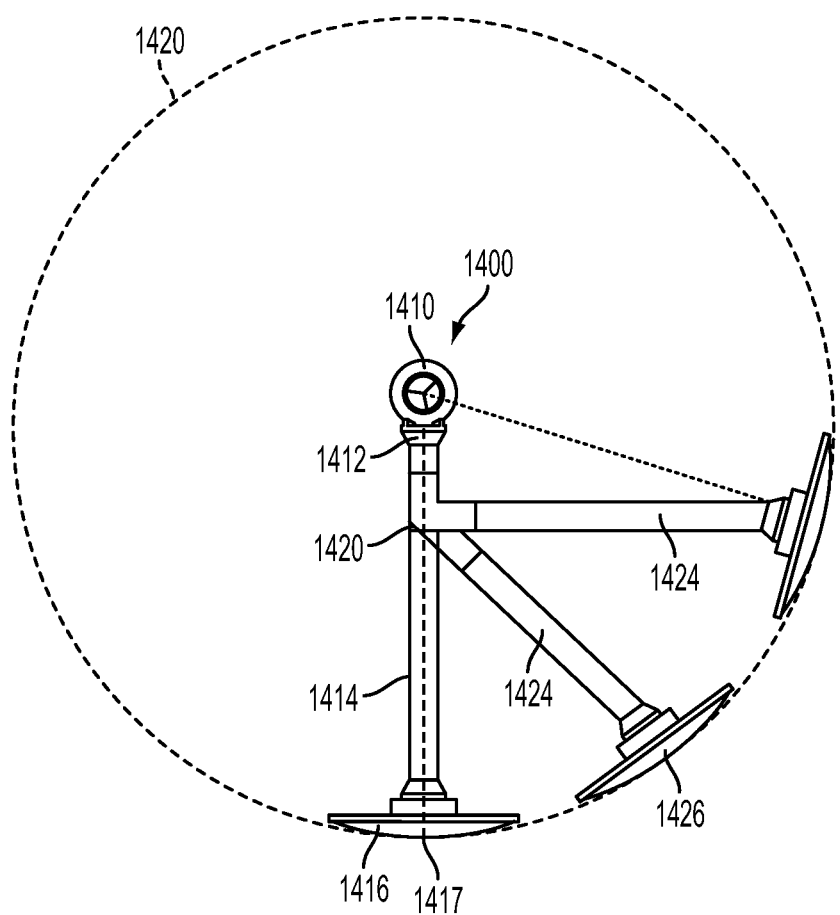
FIG. 14 illustrates an embodiment of another exemplary modular sphere bar probe.

FIG. 14 illustrates an embodiment of an exemplary modular sphere bar probe 1400. Similar to other exemplary embodiments described herein, the modular sphere bar probe 1400 can include a holder or nest 1412 that holds a retroreflector 1410. The modular sphere bar probe 1400 can also include an end plate 1416 having a rounded outer surface 1417. In exemplary embodiments, distances, R, between a center of the retroreflector 1410 and an outermost end point of the rounded outer surface 1417 is equal to a radius of curvature, R, of the rounded outer surface 1417. The configuration in which the distance between the between a center of the retroreflector 1410 and an outermost end point of the rounded outer surface 1417 is equal to the radius of curvature of the rounded outer surface 1417, defines a virtual sphere 1420. As such, the radius of the virtual sphere 1420 is also R. The rounded outer surface 1417 of the end plate 1416 is shaped as a segment of the surface of virtual sphere 1420, and contacts the (hidden) point(s) to be measured on a surface. Disposed between the nest 1412 and the end plate 1416 is a modular form of a bar or member. With the modular sphere bar probe 1400, various components can be fitted together to achieve a desired customized sphere bar probe. For example, a straight bar 1414 fitted with end plate 1416 can be inserted into the holder or nest 1412. The straight bar 1414 can be provided in a variety of lengths. Instead of straight bar 1414, angled connector 1420 can be inserted into the holder or nest 1412. The angled connector 1420 can be of any suitable angle to accommodate a wide variety of applications. Offset bars 1424 can be fitted into angled connector 1420. Offset bars 1424 can be provided with a variety of lengths. Angled end plates 1426 can be provided to attach to offset bars 1424. In exemplary embodiments, the connection between offset bars 1424 and angled end plates 1426 can be angled so that the angled end plate 1426 is properly aligned to be a segment of the surface of the virtual sphere 1420. The modular sphere bar probe 1400 allows a user to achieve a wide variety of sizes and orientations of a sphere bar probe with a relatively small number of parts, instead of having to main a collection of several different sphere bar probes.

Figure 15:
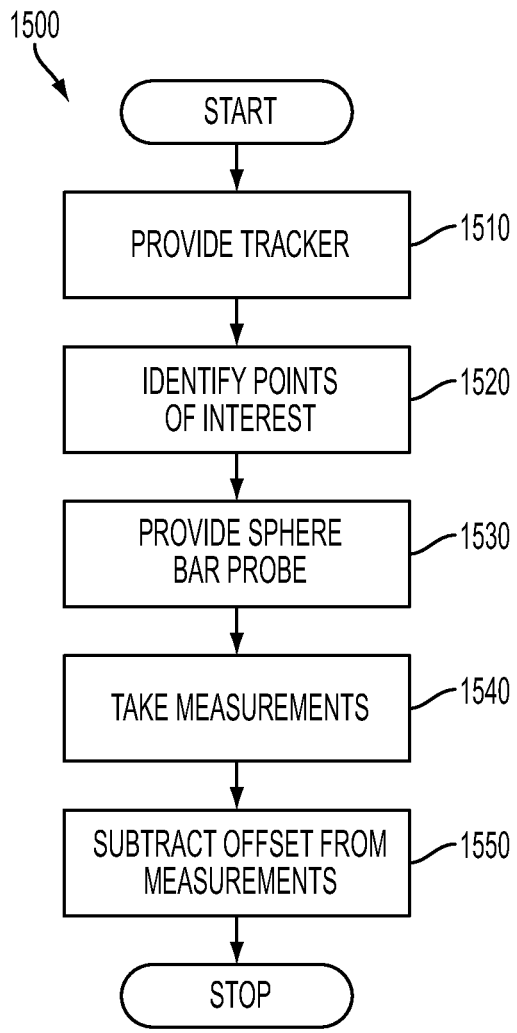
FIG. 15 illustrates a method for measuring hidden points with a laser tracker and exemplary sphere bar probe.

Regardless of the embodiment of the sphere bar probe implemented to measure hidden points, an overall method for measuring hidden points is now described. FIG. 15 illustrates a method 1500 for measuring hidden points. At block 1510, a user can provide a tracker (e.g., the tracker 10 of FIG. 1 or trackers 100 of FIGS. 7 and 8). At block 1520, the user can identify points of interest to measure with the tracker. For illustrative purposes, the points of interest are hidden from a direct line of sight of the tracker as described herein. As such, at block 1530, the user provides an exemplary sphere bar probe as described herein. At block 1540, the user takes measurements implementing the tracker and exemplary sphere bar probe. At block 1550, the user can then subtract an appropriate offset from the collection of measurement points.

Previously it was stated that the sphere bar probe may be thought of conceptually as a large SMR that has had certain of its material surface removed so that access is obtained at a limited region on the end plate 316. Software is today widely available to subtract the offset from the measurement data to account for the distance from the surface of the workpiece that is in contact with the SMR to the center of the SMR. It is not possible to subtract the offset R for a single point in isolation because it is not in general possible to know the direction of the normal vector of the workpiece at the point of contact with the SMR. Various algorithms have been developed and are contained in such software to remove the appropriate offset value from the collection of data points obtained in a particular measurement. Such algorithms are equally applicable to sphere bar probe as to a SMR since both involve the same fundamental geometry of measurement. It is appreciated that all measurement data can be taken at once and then subtracted from the collection of points according to suitable algorithms that are well-known in the art.

Figure 16:
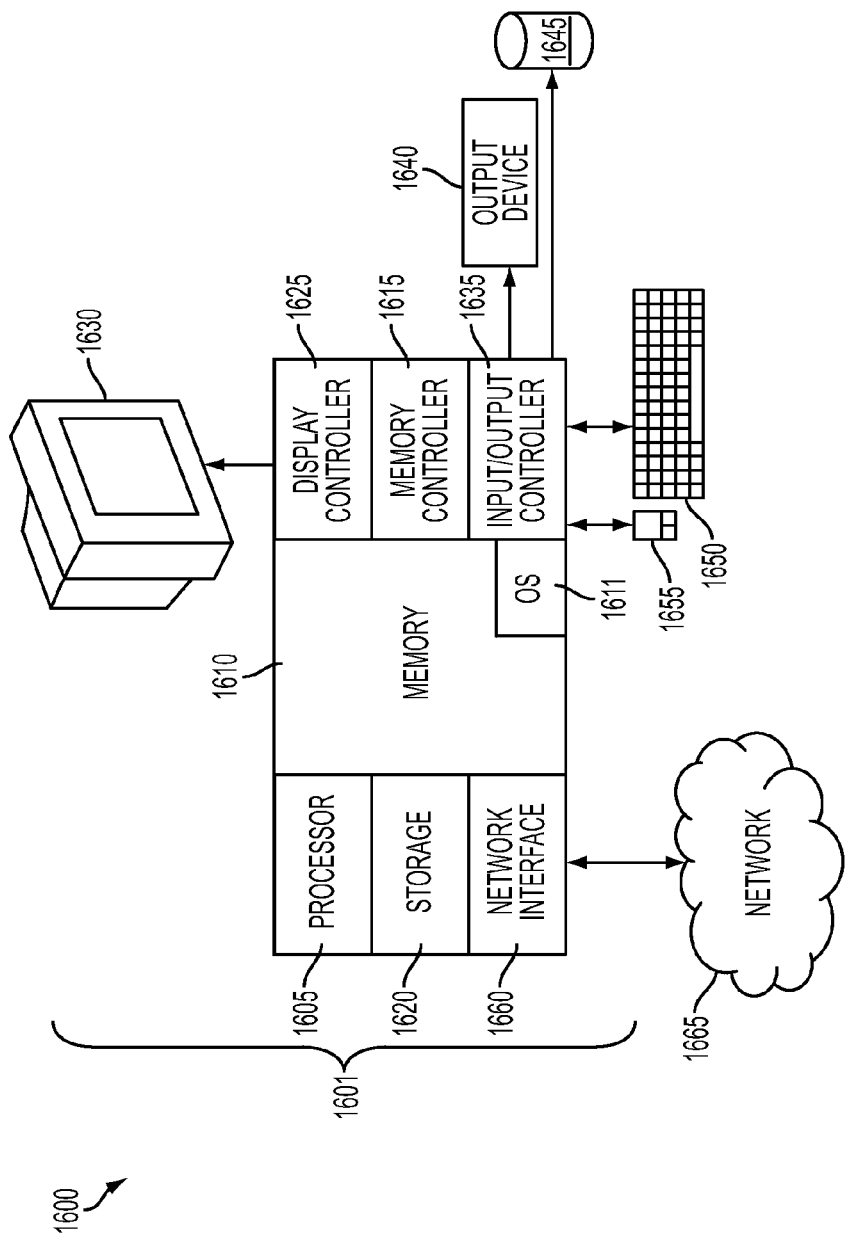
FIG. 16 illustrates an exemplary embodiment of a system that can be implemented to take the tracker measurements and to process data.

Referring again to FIG. 2, a computer 280 is described, which can be implemented to take tracker measurements and process data. FIG. 16 illustrates an exemplary embodiment of a system 1600 that can be implemented to take the tracker measurements and to process data. The methods described herein can be implemented in software (e.g., firmware), hardware, or a combination thereof. In exemplary embodiments, the methods described herein are implemented in software, as an executable program, and is executed by a special or general-purpose digital computer, such as a personal computer, workstation, minicomputer, or mainframe computer. The system 1600 therefore includes general-purpose computer 1601.

In exemplary embodiments, in terms of hardware architecture, as shown in FIG. 16, the computer 1601 includes a processor 1605, memory 1610 coupled to a memory controller 1615, and one or more input and/or output (I/O) devices 1640, 1645 (or peripherals) that are communicatively coupled via a local input/output controller 1635. The input/output controller 1635 can be, but is not limited to, one or more buses or other wired or wireless connections, as is known in the art. The input/output controller 1635 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 1605 is a hardware device for executing software, particularly that stored in memory 1610. The processor 1605 can be any custom made or commercially available processor, a central processing unit (CPU), an auxiliary processor among several processors associated with the computer 1601, a semiconductor based microprocessor (in the form of a microchip or chip set), a macroprocessor, or generally any device for executing software instructions.

The memory 1610 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 1610 may incorporate electronic, magnetic, optical, and/or other types of storage media. Note that the memory 1610 can have a distributed architecture, where various components are situated remote from one another, but can be accessed by the processor 1605.

The software in memory 1610 may include one or more separate programs, each of which comprises an ordered listing of executable instructions for implementing logical functions. In the example of FIG. 16, the software in the memory 1610 includes the methods described herein in accordance with exemplary embodiments and a suitable operating system (OS) 1611. The OS 1611 essentially controls the execution of other computer programs, such the systems and methods as described herein, and provides scheduling, input-output control, file and data management, memory management, and communication control and related services.

The methods described herein may be in the form of a source program, executable program (object code), script, or any other entity comprising a set of instructions to be performed. When a source program, then the program needs to be translated via a compiler, assembler, interpreter, or the like, which may or may not be included within the memory 1610, so as to operate properly in connection with the OS 1611. Furthermore, the methods can be written as an object oriented programming language, which has classes of data and methods, or a procedure programming language, which has routines, subroutines, and/or functions.

In exemplary embodiments, a conventional keyboard 1650 and mouse 1655 can be coupled to the input/output controller 1635. Other output devices such as the I/O devices 1640, 1645 may include input devices, for example but not limited to a printer, a scanner, microphone, and the like. Finally, the I/O devices 1640, 1645 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 1600 can further include a display controller 1625 coupled to a display 1630. In exemplary embodiments, the system 1600 can further include a network interface 1660 for coupling to a network 1665. The network 1665 can be an IP-based network for communication between the computer 1601 and any external server, client and the like via a broadband connection. The network 1665 transmits and receives data between the computer 1601 and external systems. In exemplary embodiments, network 1665 can be a managed IP network administered by a service provider. The network 1665 may be implemented in a wireless fashion, e.g., using wireless protocols and technologies, such as WiFi, WiMax, etc. The network 1665 can also be a packet-switched network such as a local area network, wide area network, metropolitan area network, Internet network, or other similar type of network environment. The network 1665 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 1601 is a PC, workstation, intelligent device or the like, the software in the memory 1610 may further include a basic input output system (BIOS) (omitted for simplicity). The BIOS is a set of essential software routines that initialize and test hardware at startup, start the OS 1611, and support the transfer of data among the hardware devices. The BIOS is stored in ROM so that the BIOS can be executed when the computer 1601 is activated.

When the computer 1601 is in operation, the processor 1605 is configured to execute software stored within the memory 1610, to communicate data to and from the memory 1610, and to generally control operations of the computer 1601 pursuant to the software. The methods described herein and the OS 1611, in whole or in part, but typically the latter, are read by the processor 1605, perhaps buffered within the processor 1605, and then executed.

When the systems and methods described herein are implemented in software, as is shown in FIG. 16, the methods can be stored on any computer readable medium, such as storage 1620, for use by or in connection with any computer related system or method.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network as described herein Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor as described herein.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In exemplary embodiments, where the methods are implemented in hardware, the methods described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

What is claimed is:

1. A retroreflector probe adapter apparatus, comprising:
   a spherically mounted retroreflector (SMR) having a cube-corner retroreflector embedded within a metal sphere, the metal sphere having a spherical surface, the spherical surface having a sphere center, the cube-corner retroreflector including three mutually perpendicular mirrors, the three mirrors intersecting in a common vertex point coincident with the sphere center; and
   an adapter including a holder, an endplate, and a member, the holder configured to receive the SMR, the endplate having a rounded outer surface with a radius of curvature R, the member having a first end attached to the holder and a second end attached to the endplate, wherein a distance from the center of the SMR, when received by the holder, to any point on the rounded outer surface of the endplate is equal to the radius of curvature R, the points on the rounded outer surface of the endplate lying on a virtual sphere having as its center the sphere center, wherein the endplate is shaped as a segment of the virtual sphere to contact points to be measured on a surface.

2. The apparatus as claimed in claim 1 wherein the holder is an SMR nest.

3. The apparatus as claimed in claim 1 wherein the member is an elongate bar.

4. The apparatus as claimed in claim 1 wherein the member is an angled bar.

5. The apparatus as claimed in claim 1, wherein the endplate comprises an edge around its circumference and configured to provide tactile feedback to a user when the adapter is misaligned.

6. The apparatus as claimed in claim 5, wherein a distance from the center of the SMR to the edge of the endplate is greater than the radius of curvature R.

7. The apparatus as claimed in claim 1, wherein:
   the member comprises an angled connector and an offset bar, a proximal end of the angled connector being connected to the holder, and a distal end of the angled connector being connected to a proximal end of the offset bar;
   the endplate comprises an angled endplate connected to a distal end of the offset bar.

8. A method for measuring points with a laser tracker, the method comprising:
   providing a retroreflector probe adapter apparatus, the retroreflector probe apparatus including a spherically mounted retroreflector (SMR) and an adapter, the SMR having a cube-corner retroreflector embedded within a metal sphere, the metal sphere having a spherical surface, the spherical surface having a sphere center, the cube-corner retroreflector including three mutually perpendicular mirrors, the three mirrors intersecting in a common vertex point coincident with the sphere center, the adapter including a holder, an endplate, and a member, the holder configured to receive the SMR, the endplate having a rounded outer surface with a radius of curvature R, the member having a first end attached to the holder and a second end attached to the endplate, wherein a distance from the center of the SMR, when received by the holder, to any point on the rounded outer surface of the endplate is equal to the radius of curvature R, the points on the rounded outer surface of the endplate lying on a virtual sphere having as its center the sphere center, wherein the endplate is shaped as a segment of the virtual sphere to contact points of interest to be measured on a surface;
   identifying a plurality of points of interest hidden from a direct line of sight from the laser tracker;
   receiving the SMR by the holder;
   placing the rounded outer surface in contact with each of the plurality of points of interest;
   measuring with the last tracker, for each of the plurality of points of interest, a distance and two angles from the laser tracker; and
   determining three-dimensional coordinates of the plurality of points, the three-dimensional coordinates based at least in part on and the distance and the two angles measured for each of the plurality of points and the radius R.

9. The method as claimed in claim 8 wherein the holder is an SMR nest.

10. The method as claimed in claim 8 wherein the member is an elongate bar.

11. The method as claimed in claim 8 wherein the member is an angled bar.

12. The method as claimed in claim 8, wherein the second end has an electrical switch that detects tilting of the retroreflector probe adapter apparatus beyond a predefined limit.

13. The method as claimed in claim 8 wherein the second end has a flat surface that provides tactile feedback to a user when the retroreflector probe adapter apparatus is tilted beyond a predefined limit.

* * * * *